J. EAGAN.
CAR DOOR LOCKING DEVICE.
APPLICATION FILED MAY 17, 1910.
987,221.
Patented Mar. 21, 1911.
2 SHEETS—SHEET 1.
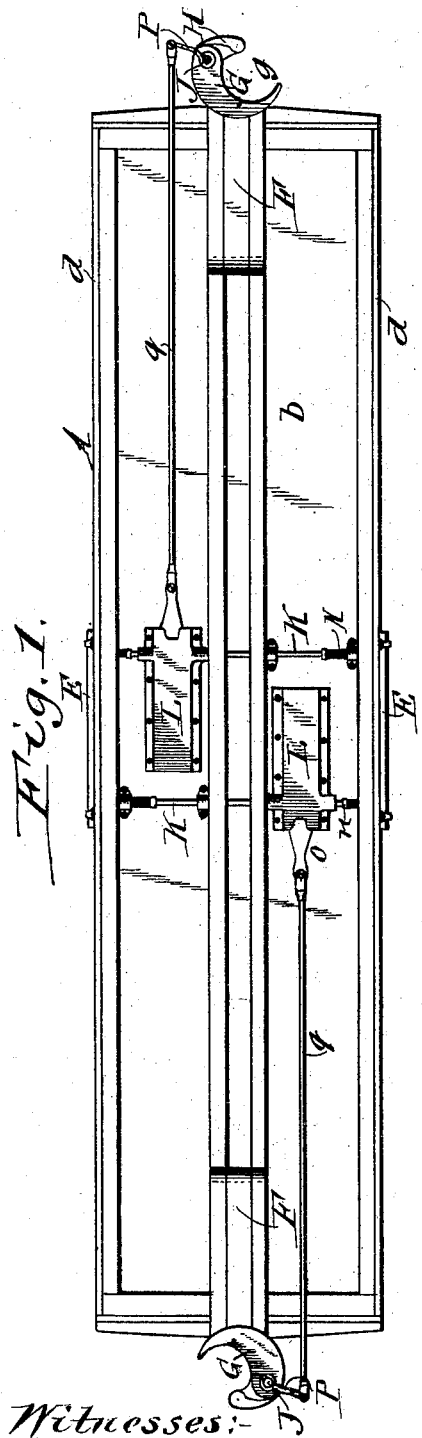
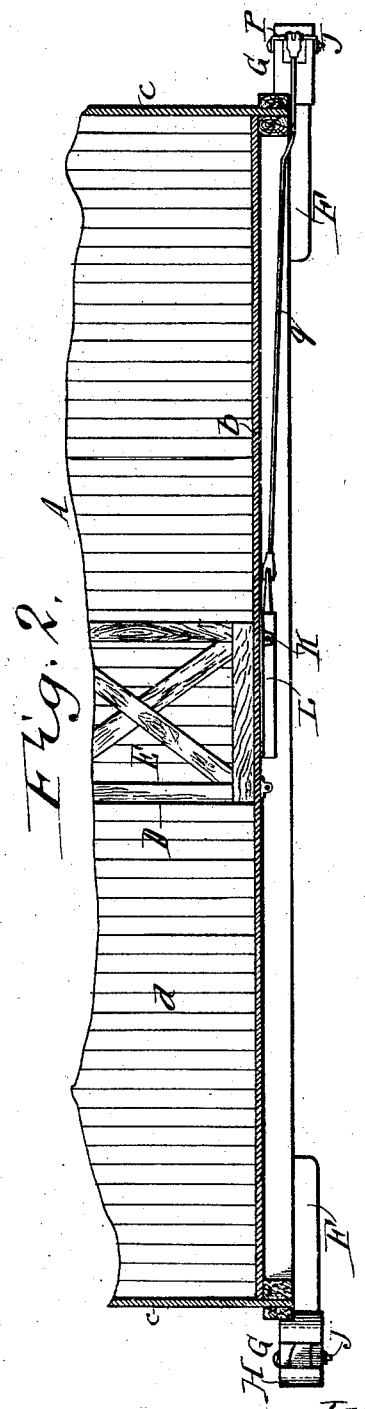

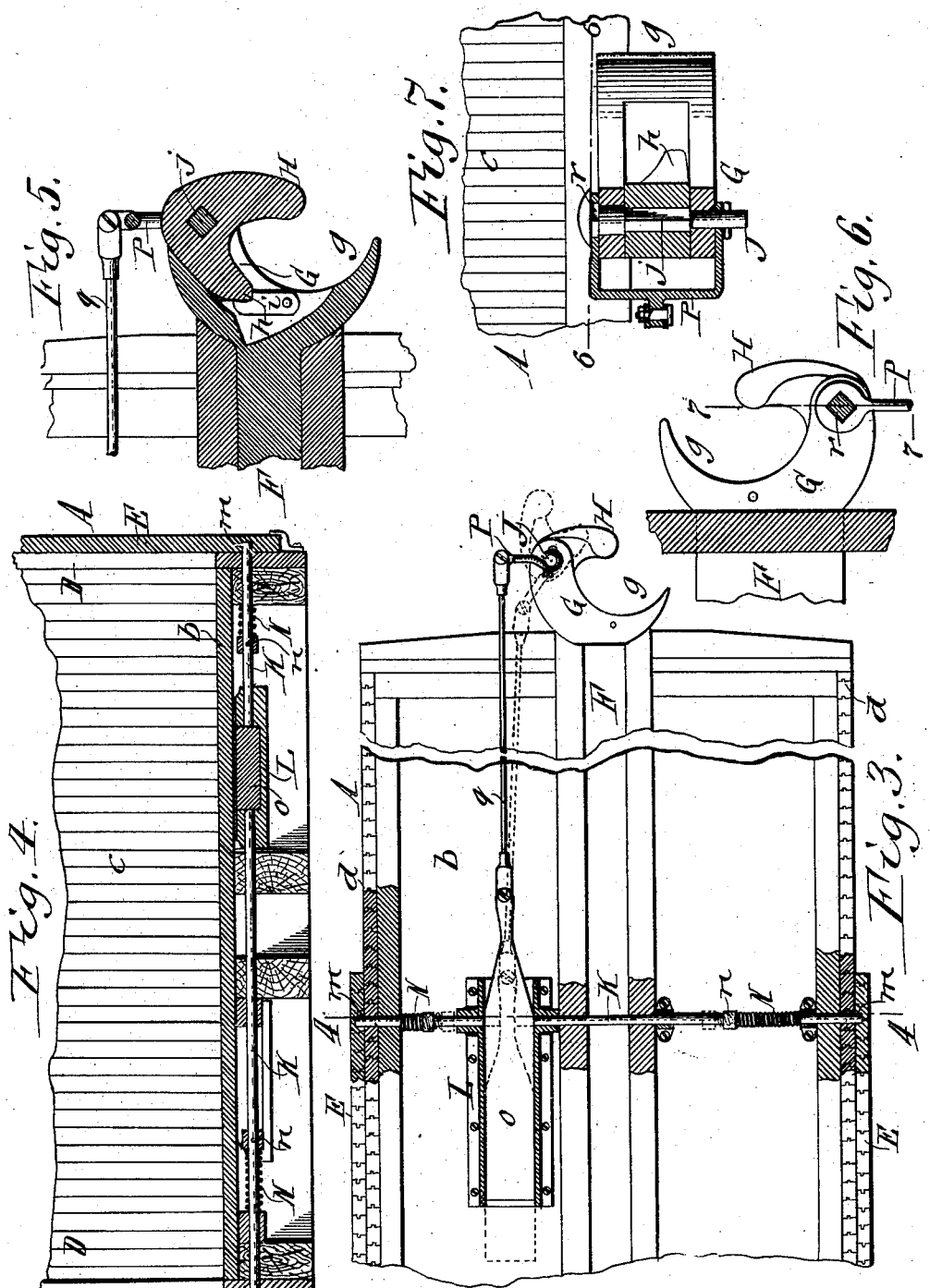

UNITED STATES PATENT OFFICE.

JOHN EAGAN, OF LACKAWANNA, NEW YORK, ASSIGNOR OF ONE-HALF TO EDWARD A. CONNOR, OF LACKAWANNA, NEW YORK.

CAR-DOOR-LOCKING DEVICE.

987,221. Specification of Letters Patent. Patented Mar. 21, 1911.

Application filed May 17, 1910. Serial No. 561,922.

*To all whom it may concern:*

Be it known that I, JOHN EAGAN, a citizen of the United States, residing at Lackawanna, in the county of Erie and State of New York, have invented new and useful Improvements in Car-Door-Locking Devices, of which the following is a specification.

This invention relates to a car door locking device.

As is well known burglary of freight cars occurs most commonly when the cars are made up in trains and either at rest in the freight yard or while in motion on the roadway. The reason for this is that the cars when disconnected from each other are usually attended by freight handlers in the regular employ of the company, so that burglary or theft is not likely to occur at this time.

The object of this invention consists principally in the production of a car door lock which depends for its operation upon the working or movement of a member of the car coupling device whereby one car is coupled with another, these parts being so organized that when two cars are coupled with each other the door locking device is so shifted as to lock the door in its closed position while upon uncoupling the car from another car the door locking device is operated to release the car door and permit the same to be opened.

In the accompanying drawings consisting of 2 sheets: Figure 1 is a bottom plan view of a car equipped with my improved door locking device. Fig. 2 is a vertical longitudinal section thereof. Fig. 3 is a fragmentary bottom plan view of the car, partly in section, showing the door locking device in a different position from that shown in Fig. 1. Fig. 4 is a vertical transverse section on line 4—4, Fig. 3. Fig. 5 is a fragmentary horizontal section of one of the car coupling devices and the adjacent parts of the door locking device associated therewith. Fig. 6 is a fragmentary horizontal section on line 6—6, Fig. 7. Fig. 7 is a fragmentary vertical transverse section on line 7—7, Fig. 6.

Similar letters of reference indicate corresponding parts throughout the several views.

A represents the body of a box freight car which may be of any suitable construction, that shown in the drawings comprising a bottom $b$, two transverse end walls $c$, $c$, two longitudinal side walls $d$ each provided with a door opening or doorway D and two horizontally movable doors E which slide lengthwise on the outer sides of the side walls and are adapted to cover or uncover the doorways of the car.

At opposite ends of the car body the same is provided with coupling devices whereby either end of the same may be coupled with another car or cars for forming a train. Each of these coupling devices may be of various constructions but that shown in the drawing is substantially like that now in general use and comprises a shank F mounted lengthwise on the underside of one end of the car, a coupling head G arranged at the front end of the shank and provided with a jaw $g$ on one side, a horizontally swinging knuckle H pivoted on the opposite side of the draw head and adapted when turned inwardly or backwardly to engage with a similar knuckle of the coupling device of another car, an inwardly projecting tail $h$ formed on the knuckle and a detent or dog $i$ arranged on the coupling head and adapted to engage with the tail in the rearward position of the same for the purpose of holding the knuckle in its operative position.

The knuckle and tail are preferably formed integrally as is common in this type of car couplers and the same are pivoted to the draw head by means of a vertical pin J which, for purposes to be presently described, turns with the knuckle. This is preferably effected by making the central part of the pivot pin square as shown at $j$ in Figs. 5 and 7 and providing the knuckle with a correspondingly shaped opening for receiving this square part of the pivot pin.

On the underside of the car adjacent to each doorway is arranged a horizontally and transversely movable locking bolt K which is guided at its outer end in the adjacent timbers and side wall of the car body while its inner end is guided in a casing L secured to the underside of the car body. The two locking bolts of opposite doors are preferably arranged transversely in line and guided in opposite sides of the casing L. Upon closing the car doors and pushing out the locking bolts the outer end of each of these bolts engages with a recess $m$ on the inner side of the corresponding car door near the lower edge thereof and thereby holds the same against being opened. Each of the locking bolts is yieldingly held in its retracted position by means of a spring N which preferably surrounds the bolt and bears at one end against an adjacent longitudinal timber or beam of the car body while its opposite end bears against a shoulder which is formed on the bolts by means of a collar $n$ secured thereto, as shown in Figs. 3 and 4. While the locking bolts are thus retracted the doors of the car may be freely moved into their opened or closed position. The outward movement of the companion pair of locking bolts is preferably effected by means of a longitudinally and horizontally movable cam $o$ preferably of wedge shape which is guided in a way in the casing L and is provided on opposite sides with inclines which are adapted to engage with the inner ends of the locking bolts.

When the wedge-shaped cam $o$ is in a rearward position, as shown by dotted lines in Fig. 3, the springs N are permitted to retract or move the locking bolts out of the path of the car doors. Upon moving the cam forwardly the inclined faces thereof engage with the inner ends of the locking bolts and cause their outer ends to engage with the recesses in the car doors, as shown by full lines in Fig. 3, thereby locking the doors in their closed position. This longitudinal movement of the wedge for locking or unlocking the car doors is preferably effected by connecting the same with the movable coupling member or knuckle H of the car coupling device, for which purpose these parts are so organized that when the knuckle is moved into its closed or coupled position the cam will be drawn forwardly and cause the locking bolts to engage with the car doors while upon turning the knuckle outwardly to its uncoupled position the cam will be moved backwardly so as to permit the springs to disengage the locking bolts from the car doors. The preferred means for thus operatively connecting the coupling knuckle with the shifting cam are shown in the drawings and comprises a U-shaped rock arm or yoke P having the inner ends of its members connected with the pivot pin J of the knuckle while its outer end is connected by a draft rod $q$ with the shifting cam. The lower member of the yoke is mounted on the lower end of the pivot pin while the upper member receives the upper or headed end of this pin. The rock arm or yoke is compelled to turn with the pivot pin J preferably by making the upper end of the pin below its head square in cross section, as shown at $r$ and engaging the same with a correspondingly shaped opening in the upper member of the yoke, as shown in Figs. 6 and 7. It follows from this construction that whenever the knuckle is pushed inwardly or rearwardly into the position in which it interlocks with the knuckle of another car for coupling adjacent cars, the cam will be moved forwardly and cause the locking bolts to be pushed laterally and interlock with the car doors so as to prevent opening of the latter. Upon turning the knuckle outwardly or forwardly into its inoperative position for uncoupling adjacent cars the cam will be pushed backwardly and permit the springs to withdraw the locking bolts from the car doors and thereby enable the latter to be pushed lengthwise of the car body for uncovering the doorways or openings thereof.

A door locking device of the character described is combined with the coupler at each end of the car, so that the doors may be locked upon coupling either end of the car with another car and also when the car is coupled at both ends with two other cars. It is therefore possible to lock the doors of a car which is at the end of a train as well as one which is arranged between two cars of a train. The employment of two coupling devices for this purpose is possible by arranging the draft rods, cams and guideways on opposite sides of the longitudinal center of the car, as shown in Fig. 1.

If for any reason the coupling device or the draft rigging at either end of the car should give way and be pulled off from the car the draft rod and shifting cam associated with the respective coupling device will be simply pulled away from the respective casings and locking bolts without disturbing other parts of the door locking device, thereby avoiding breakage of the entire locking mechanism and permitting repairs of the same to be effected at a minimum cost. In actual practice the several working parts of the locking mechanism are so connected that they cannot be easily dismembered and the same are also covered by suitable housings, so that they are not readily accessible.

It will now be obvious that so long as a car equipped with this locking device is coupled with another car the doors thereof are locked against opening, thereby preventing tampering with the contents of the car at this time. Inasmuch as cars are usually coupled in this manner when located in exposed places where theft is most likely to occur, access to the car for rifling the same of its contents cannot possibly occur in the easy manner heretofore practiced. When it is desired to unload a car it is only necessary to detach the same from other cars of the train by opening the couplers thereof and as this is usually done in the freight yard by regular attendants no unauthorized removal of the goods from the car is likely to occur, thereby reducing car burglary to a minimum and avoiding the annoyance heretofore attending such practice.

I claim as my invention:

1. The combination of a car body having a movable door, a coupler having a horizontally swinging coupling knuckle, a door locking device comprising a locking member adapted to move into and out of engagement with the car door, and means for operating said locking member by motion derived from said knuckle.

2. A car door locking device comprising a locking bolt movable into and out of engagement with the car door, a spring operating to withdraw the bolt from the door, a cam for moving the bolt into engagement with the door, and means for shifting said cam by motion derived from the movable member of the car coupling device.

3. The combination of a car having a doorway, a movable door for said doorway having a recess, a locking bolt guided on the car and movable into and out of engagement with said recess, a cam engaging said locking bolt, a car coupler mounted on the car and having a pivoted coupling knuckle, a rock arm connected with the knuckle and a draft rod connected with said cam and rock arm.

4. The combination of a car having doorways on its opposite sides, transversely movable locking bolts guided on the car and adapted to engage at their outer ends with said doors, a wedge-shaped cam movable lengthwise of the car and engaging on its opposite sides with the inner ends of the locking bolts, a car coupler mounted on the car and provided with a pivoted coupling knuckle, a rock arm connected with the knuckle, and a draft rod connecting said cam and rock arm.

Witness my hand this 14th day of May, 1910.

JOHN EAGAN.

Witnesses:
 THEO. L. POPP,
 EDWARD A. CONNOR.

Copies of this patent may be obtained for five cents each, by addressing the "Commissioner of Patents, Washington, D. C."